United States Patent
Kao et al.

(10) Patent No.: US 7,526,020 B2
(45) Date of Patent: Apr. 28, 2009

(54) CIRCUIT FOR IMPROVING CHANNEL IMPULSE RESPONSE ESTIMATION AND COMPENSATING FOR REMNANT FREQUENCY OFFSET IN THE ORTHOGONAL FREQUENCY DIVISION MULTIPLEXING (OFDM) BASEBAND RECEIVER FOR IEEE 802.11A/G WIRELESS LAN STANDARD

(75) Inventors: Kai-Pon Kao, Hsinchu (TW); Tien-Hui Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 560 days.

(21) Appl. No.: 11/224,757

(22) Filed: Sep. 13, 2005

(65) Prior Publication Data
US 2007/0058734 A1    Mar. 15, 2007

(51) Int. Cl.
*H03H 7/30* (2006.01)
(52) U.S. Cl. .................................... 375/229
(58) Field of Classification Search ............ 375/229
See application file for complete search history.

(56) References Cited
U.S. PATENT DOCUMENTS 6,700,919 B1 * 3/2004 Papasakellariou .......... 375/130
7,065,146 B1 * 6/2006 Lou et al. .................... 375/262
7,133,473 B1 * 11/2006 Lou et al. .................... 375/341
7,228,113 B1 * 6/2007 Tang et al. ................... 455/101
7,346,135 B1 * 3/2008 Narasimhan ................ 375/346
2002/0065047 A1 * 5/2002 Moose ......................... 455/63
2003/0128751 A1 * 7/2003 Vandenameele-Lepla ... 375/229
2005/0089109 A1 * 4/2005 Yun et al. .................... 375/260
2006/0171297 A1 * 8/2006 Ghosh ......................... 370/210

* cited by examiner

*Primary Examiner*—Juan A Torres
(74) *Attorney, Agent, or Firm*—Thomas, Kayden, Horstemeyer & Risley

(57) ABSTRACT

A circuit for improving accuracy of channel impulse response estimation and compensating for remnant frequency offset in a receiver of an orthogonal frequency division multiplexing (OFDM) system is provided. The circuit comprises an equalizer, for compensating a first signal for channel distortion with the channel impulse response estimate to generate a second signal. The circuit also comprises a remnant frequency compensation module, coupled to the equalizer, for rotating a phase of the second signal with a phase angle of an phase offset coefficient calculated according to a plurality of pilot signals of the second signal to generate a third signal. The circuit further comprises a error estimation module, coupled to the remnant frequency compensation module, for generating an error estimate according to the third signal and its hard decision estimate, and the error estimate is further fed back to the equalizer to refine the channel impulse response estimate.

22 Claims, 7 Drawing Sheets

CIRCUIT FOR IMPROVING CHANNEL IMPULSE RESPONSE ESTIMATION AND COMPENSATING FOR REMNANT FREQUENCY OFFSET IN THE ORTHOGONAL FREQUENCY DIVISION MULTIPLEXING (OFDM) BASEBAND RECEIVER FOR IEEE 802.11A/G WIRELESS LAN STANDARD

BACKGROUND

The present invention relates to a baseband processor of an orthogonal frequency division multiplexing (OFDM) receiver, and more particularly, to an OFDM baseband processor for wireless LAN (WLAN) IEEE 802.11a or IEEE 802.11g standards.

Orthogonal frequency division multiplexing (OFDM) is a modulation technique for wireless LAN standards such as IEEE 802.11a or 802.11g. OFDM distributes the data over a large number of carriers (or sub-carriers) that are spaced apart at precise frequencies. This spacing provides the "orthogonality" that prevents the demodulators from seeing frequencies other than their own. Because the data is split for transmission on several sub-carriers, the duration of every transmitted symbol on each sub-carrier is increased, and the amount of crosstalk between symbols or inter-symbol interference (ISI) is reduced. This is the reason why OFDM is so popular among applications for high bit rate communication systems nowadays.

In IEEE 802.11a, the carrier frequency is 5 GHz. There are 64 implied subcarrier frequencies with a spacing of 312.5 kHz(=20 MHz/64, wherein 20 MHz is the channel bandwidth). Among the 64 implied subcarriers, there are 52 non-zero subcarriers, which includes 48 data subcarriers carrying data and four pilot subcarriers used as pilot tones. Each subcarrier hums away at 312.5 k symbols/second. Data is blocked into 3.2-microsecond frames with an additional 0.8 microsecond of cyclic prefix tacked on for mitigation of intersymbol interference, and the data frame and the cyclic prefix thereof forms a data symbol lasting for 4 µs. A 64-point fast Fourier transform is performed over 3.2 microseconds to extract the 48 data symbols on the 48 QAM signals. For binary phase-shift keying (BPSK), with 1 bit per symbol, that is 48 bits in 4 microseconds, for an aggregate data rate of 12 Mbits/s. Half-rate convolutional coding brings the net rate down to 6 Mbits/s. For 64 QAM, the aggregate data rate is six times higher, or 72 Mbits/s.

FIG. 1 illustrates the main function blocks of the transmitter end 100 of the OFDM baseband processor according to the IEEE 802.11a standard. The main function blocks of the transmitter end include a signal mapper 102, a serial to parallel converter 104, an inverse fast Fourier transform (IFFT) block 106, a parallel to serial converter 108, a cyclic prefix (CP) adding block 110, a digital to analog converter (DAC) 112, and a radio frequency (RF) transmitter 114. OFDM is a multi-carrier modulation technique. First, the data stream is modulated with signal mapper 102 using modulation techniques such as Quadrature Amplitude Modulation (QAM) or Binary Phase Shift keying (BPSK). The next step in OFDM modulation is to convert the serial data into parallel data streams with the serial to parallel converter 104. The Inverse Fast Fourier transform (IFFT) is then performed on the modulated data with the IFFT block 106. The IFFT is at the heart of the OFDM modulation, because it provides a simple way to modulate data streams onto orthogonal subcarriers. The data streams before and after IFFT are designated as X[n] and x[n] to represent frequency domain data and time domain data respectively, wherein n represents the order number of the subcarriers. After the IFFT, the parallel data streams are concatenated into a single data stream by the parallel to serial converter 108. Finally a characteristic cyclic prefix (CP) is added to each OFDM symbol being transmitted in the single data stream with the cyclic prefix adding block 110. The OFDM symbol is now ready, and after being converted from digital to analog form with the DAC 112 and modulated by the RF transmitter with a carrier frequency fc, it is sent over the channel 150 as RF signals to the receiver end.

FIG. 2 illustrates the main function blocks of receiver end 200 of the OFDM baseband processor according to the IEEE 802.11a standard. The main function blocks of the receiver end 200 include a RF receiver 202, a sampler 204, a synchronization block 206, a cyclic prefix remover 208, a serial to parallel converter 210, a fast Fourier transform (FFT) block 212, a channel estimation and equalization block 214, a parallel to serial converter 216, and a signal demapper 218. The receiver end 200 performs the inverse of the transmitter end 100. After transmitting through channel 150, the signal is received by the RF receiver 202 with carrier frequency fc'. The received signal is then passed to the sampler 204 and sampled. Then the data samples are compensated for carrier frequency offset (CFO) with the CFO correction block 226 inside the synchronization block 206 wherein the CFO is caused from the difference between carrier frequency of transmitter end 100 and receiver end 200 (fc and fc'). The other function blocks inside the synchronization block 206 are frame detection block 220 and timing synchronization block 224. Frame detection is to detect the symbol frame of the data samples, and timing synchronization is to detect the symbol boundary of the data samples inside data frame. The receiver end 200 has to determine the symbol boundary to assure that only the signal part of every OFDM symbol is written into the FFT and no part of the cyclic prefix. Implementing timing synchronization can also avoid Inter Symbol Interference (ISI) caused by sampling timing errors. After the cyclic prefix of symbols are removed with the CP removal block 208, the data samples are converted from serial to parallel, and applied to the FFT block 212. The Fast Fourier Transform (FFT) converts the time domain samples back into a frequency domain. Because the signal through channel 150 has suffered from frequency selective attenuation, the data samples are passed to the channel estimation and equalization block 214 for equalizing the attenuation. The parallel to serial converter block 216 converts the parallel data samples into a serial data stream. Finally, the data stream is demodulated with a QAM or BPSK scheme by signal demapper 218 to recover the original input data.

There are many sources of the frequency offset in wireless systems. The main sources are the difference between local oscillators at the transmitter and the receiver and the Doppler shift. Frequency offset destroys the orthogonality between the OFDM symbol subcarriers and introduces inter-channel interference (ICI) at the output of the OFDM demodulator. Therefore, the CFO correction block 226 shown in FIG. 2 is required to compensate the samples for CFO. The preamble of an OFDM packet specified by the IEEE standard consists of 10 identical short training symbols (each containing 16 data samples) and two identical long training symbols (each containing 64 data samples). These symbols can be used for the CFO estimation in the conventional method. The CFO is estimated based on some repeated training symbols with structures that are different due to CFO from ideal structures. The conventional method of the frequency offset estimation uses equations based on maximum likelihood (ML) criterion. These equations perform the search for the maximum of the correlation between the received training symbols or their functions to derive CFO. However, there is still some remnant CFO not compensated for in the conventional method. Because the OFDM system is far more vulnerable to the carrier frequency offset than single-carrier systems, even the remnant CFO of a small fraction of the subcarrier spacing can cause serious performance degradation if not properly compensated.

FIG. 3 shows an equalizer 300 for implementing channel equalization in the conventional method. The equalizer 300 is one embodiment of the channel estimation and equalization block 214 shown in FIG. 2. Channel equalization compensates for channel distortion caused from multi-path fading channels, which introduce inter-symbol interference (ISI) in the received signal. To remove ISI from the signal, the equalizer 300 require knowledge about the channel impulse response $H_k$, which can be provided by a channel estimator 302. The suffix k represents the order of the sub-carriers, and channel estimation in OFDM is typically done by using a simple estimation technique in the frequency domain independently in all the sub-carriers. The reciprocal circuit 304 then generates the reciprocal $R_k$ of the channel impulse response $H_k$. Assume the equalizer 300 receives signal $Y_k$ from FFT block 212, the equalization circuit 306 can then use the reciprocal $R_k$ of the channel impulse response $H_k$ to compensate the signal $Y_k$ for channel distortion to generate a signal $X_k$. However, if the estimate of channel impulse response $H_k$ is not accurate enough, the signal $X_k$ will not reflect the original signal in the transmitter end. Thus there is a need for a method to obtain more accurate estimation of the channel impulse response $H_k$.

SUMMARY

It is therefore an object of the present invention to provide a circuit for improving accuracy of channel impulse response estimation and compensating for remnant frequency offset in a receiver of an orthogonal frequency division multiplexing (OFDM) system.

An embodiment of a circuit for improving accuracy of channel impulse response estimation and compensating for remnant frequency offset is provided. The circuit comprises an equalizer, for compensating a first signal for channel distortion with the channel impulse response estimate to generate a second signal. The circuit also comprises a remnant frequency compensation module, coupled to the equalizer, for rotating a phase of the second signal with a phase angle of phase offset coefficient calculated according to a plurality of pilot signals of the second signal to generate a third signal. The circuit further comprises a error estimation module, coupled to the remnant frequency compensation module, for generating an error estimate according to the third signal and its hard decision estimate, and the error estimate is further fed back to the equalizer to refine the channel impulse response estimate.

In another provided embodiment of a circuit for improving accuracy of channel impulse response estimation, the circuit comprises an equalizer, for compensating a first signal for channel distortion with the channel impulse response estimate to generate a second signal. The circuit also comprises an error estimation module, coupled to the equalizer, for generating an error estimate according to a hard decision estimate of the second signal and the first signal. Then the error estimate is further fed back to the equalizer to refine the channel impulse response estimate.

In another provided embodiment of a circuit for compensating for remnant frequency offset, the circuit comprises an equalizer, for compensating a first signal for channel distortion with the channel impulse response estimate to generate a second signal. The circuit also comprises a remnant frequency compensation module, coupled to the equalizer, for rotating a phase of the second signal with a phase angle of an phase offset coefficient calculated according to a plurality of pilot signals of the second signal to generate a third signal.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
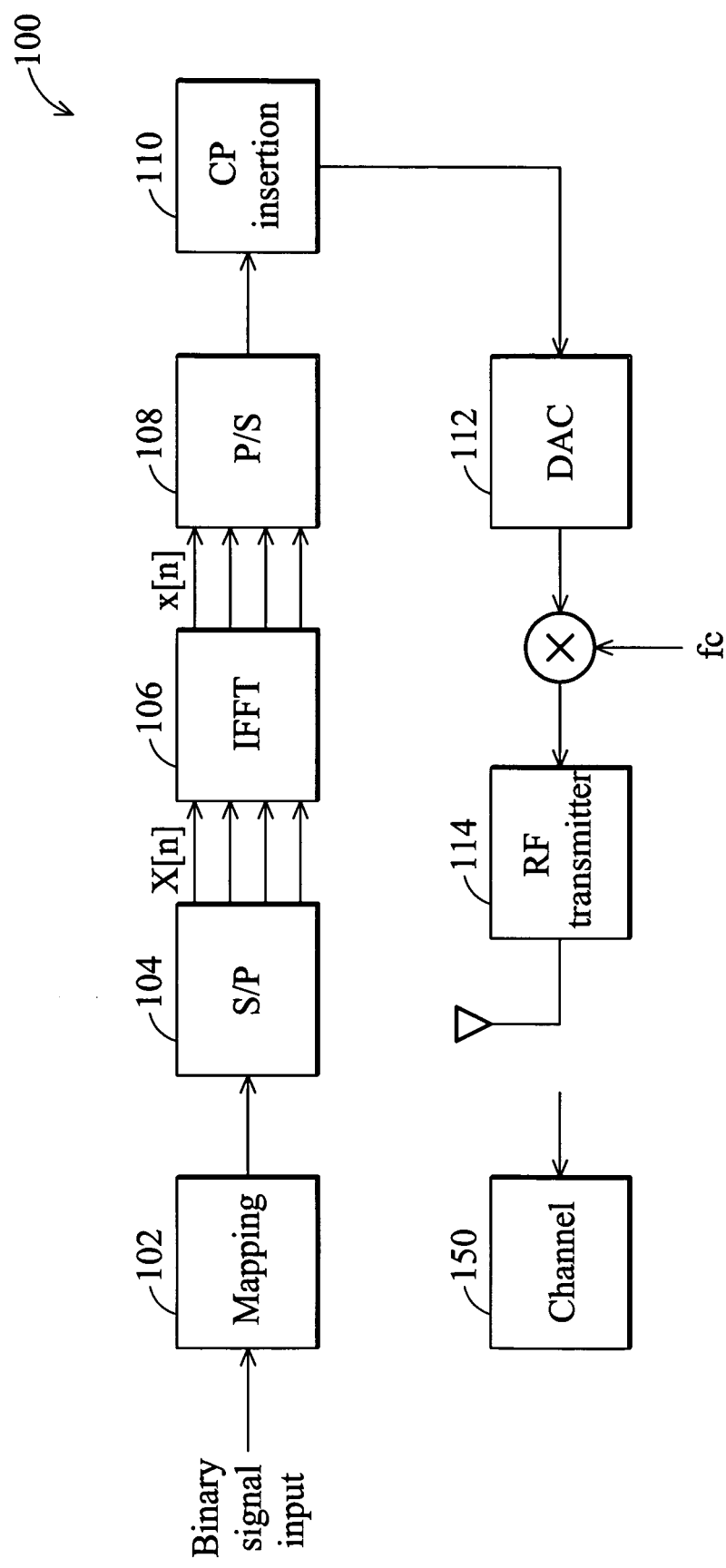
FIG. 1 illustrates the main function blocks of the transmitter end of the OFDM baseband processor according to the IEEE 802.11a standard.
Figure 2:
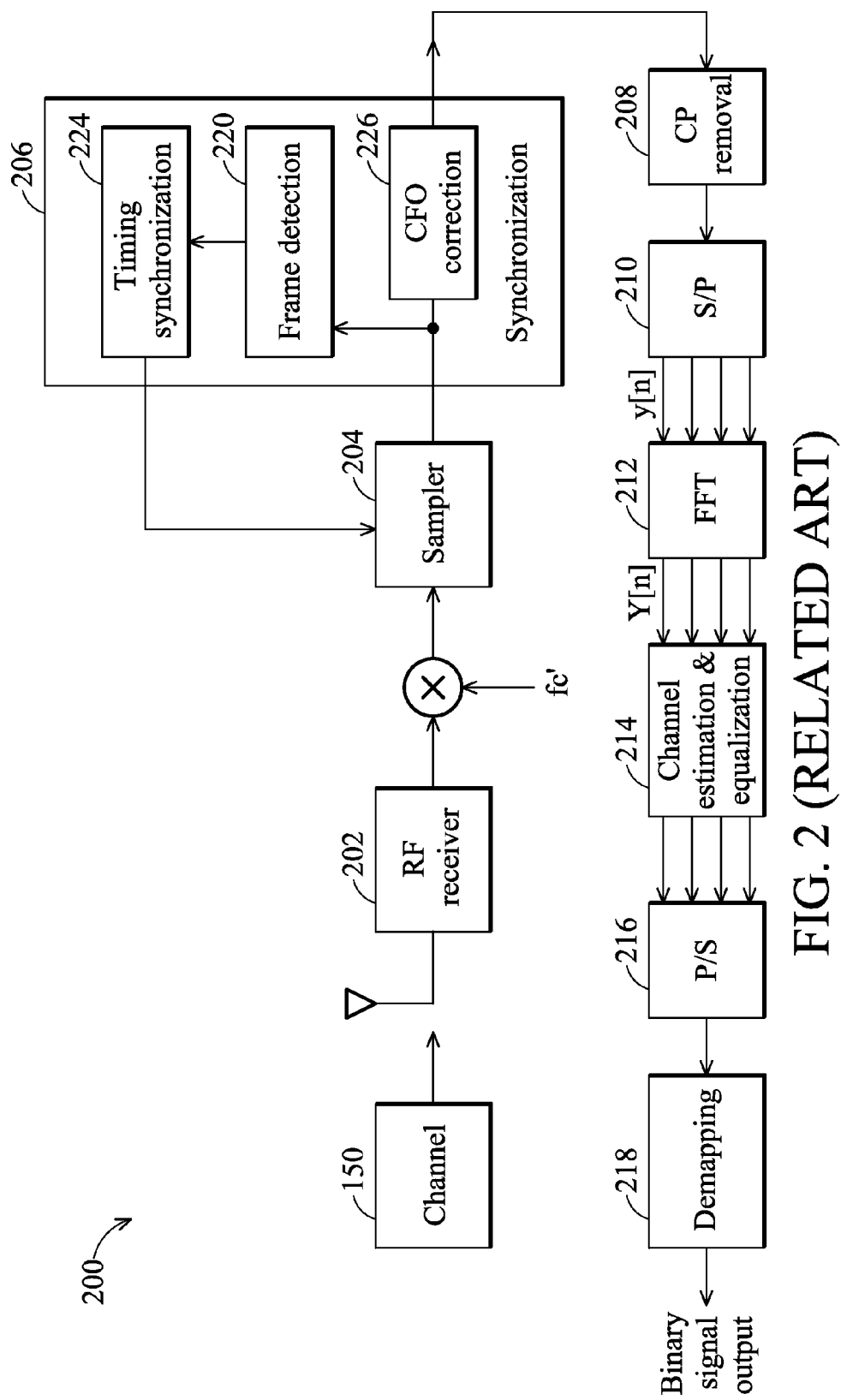
FIG. 2 illustrates the main function blocks of receiver end of the OFDM baseband processor according to the IEEE 802.11a standard.
Figure 3:
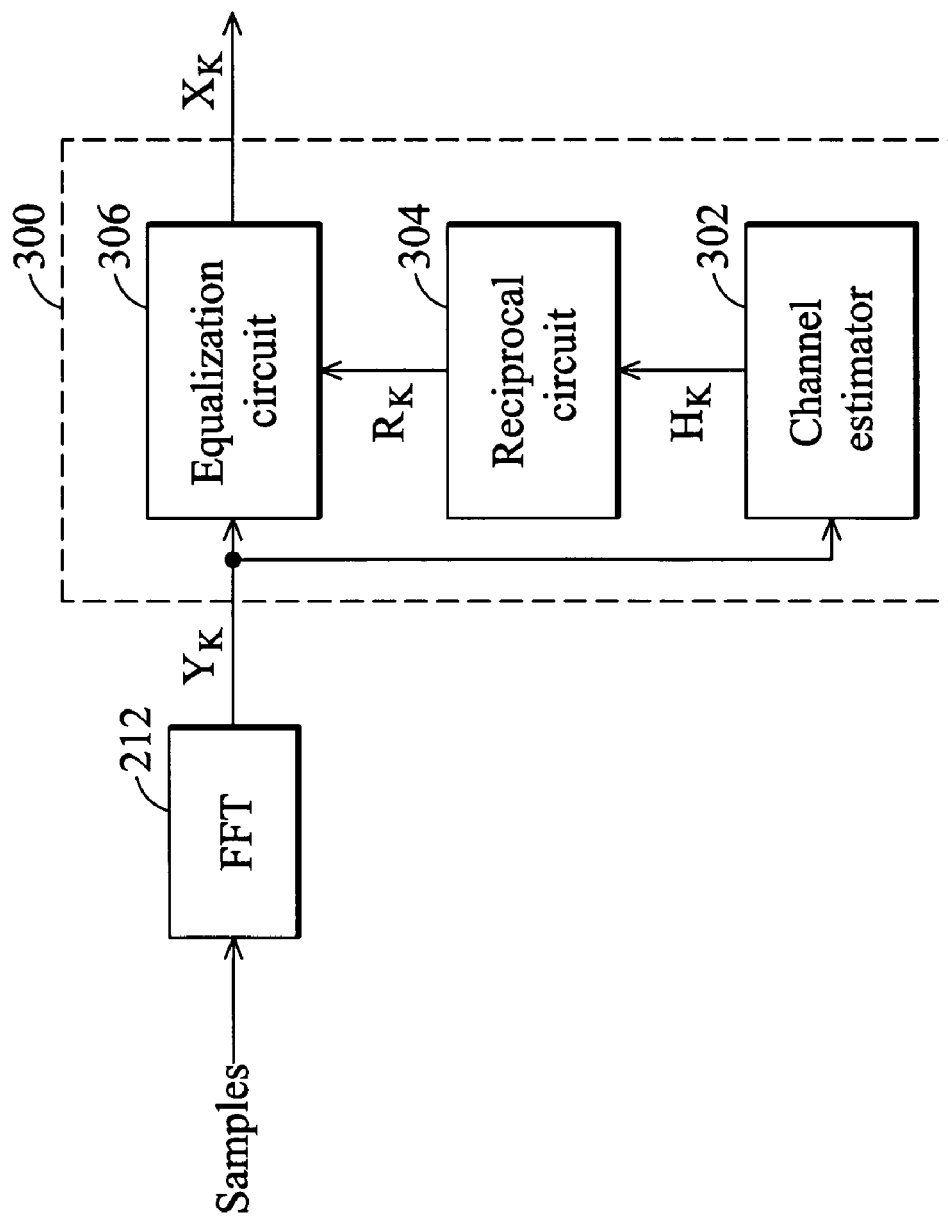
FIG. 3 shows an equalizer to implement channel equalization in the conventional method.
Figure 4:
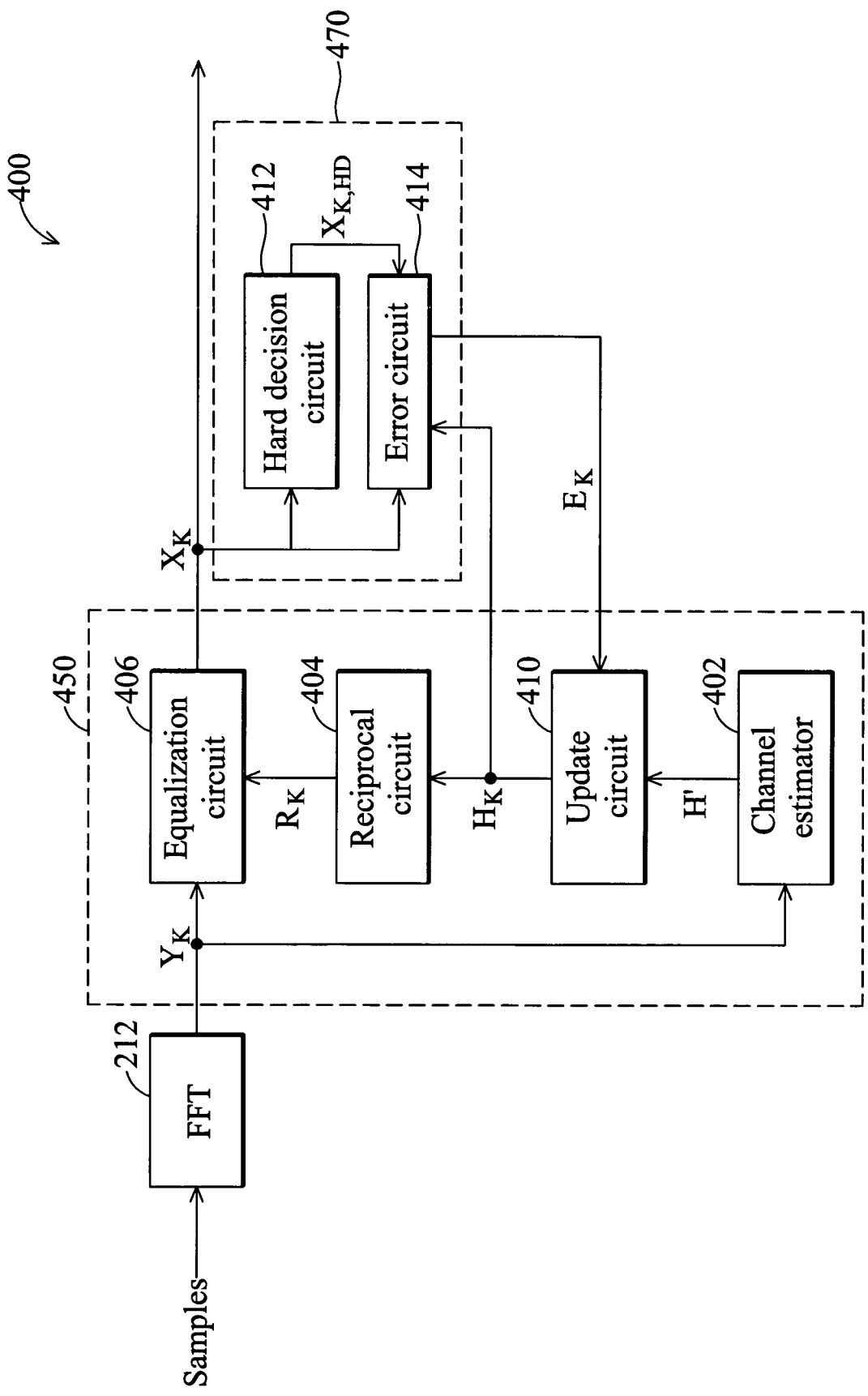
FIG. 4 illustrates the main function blocks of a circuit for channel equalization with improved channel impulse response estimation accuracy according to an embodiment of the present disclosure.

FIG. 4 illustrates the main function blocks of a circuit 400 for channel equalization with improved channel impulse response estimation accuracy according to an embodiment of the present disclosure, and the circuit 400 comprises an equalizer 450 and an error estimation module 470. Equalizer 450 resembles the equalizer 300 shown in FIG. 3, but the error estimation module 470 is provided for improving the channel impulse response estimation accuracy. The error estimation module 470 uses a hard-decision equation to generate a hard-decision estimate of the equalized signal, which is fed back to the next iteration of the estimation of channel impulse response on the next sub-carrier to improve its accuracy.

Because the equalizer 450 processes frequency domain data, samples of the received signal are delivered to a FFT block 212 to perform fast Fourier transformation and convert the samples on the k-th sub-carrier to frequency domain signal $Y_k$, wherein the suffix k represents the order of sub-carrier. The equalizer 450 includes a channel estimator 402, an update circuit 410, a reciprocal circuit 404, and an equalization circuit 406. First, channel estimator 402 generates an estimate H' of the channel impulse response. An update circuit 410 then generates a revised estimate $H_{k(n)}$ of channel impulse response of the k-th sub-carrier at current time index n according to an error estimate $E_{k(n-1)}$ and a channel impulse response estimate $H_{k(n-1)}$ of the k-th sub-carrier at the last time index n−1 with the following equation:

$$H_{k(n)} = H_{k(n-1)} + u \times E_{k(n-1)} \times \text{conj}(X_{k,HD(n-1)}),$$

wherein the parameter n in the parentheses represents the time index of the OFDM symbols. The estimate H' of the channel impulse response from the channel estimator 402 is used as the initial value $H_{k(0)}$ of the channel impulse response of the k-th sub-carrier to generate the $H_{k(1)}$ and the estimates at the following time index by iteration. u is a predetermined constant, $E_{k(n-1)}$ is an error estimate at the last time index generated from an error circuit 414, and conj $(X_{k(n-1)})$ is the conjugate of a signal $X_{k(n-1)}$ at the last time index generated from the equalization circuit 406. The error estimate $E_{k(n-1)}$ and signal $Z_{k(n-1)}$ is further described in the following. The reciprocal circuit 404 can then generate the reciprocal $R_k$ of the revised channel impulse response estimate $H_k$.

Equalization circuit 406 compensates the signal $Y_k$ for channel distortion with the reciprocal $R_k$ to generate a signal $X_k$. Signal $X_k$ is then fed to the error estimation module 470, which includes a hard decision module 412 and an error circuit 414. The hard decision circuit 412 use a hard decision equation to generate a hard decision estimate $X_{k,HD}$ of the signal $X_k$. Thus, the error circuit 414 can calculate an error estimate $E_k$ between signal $X_k$ and its hard decision estimate $X_{k,HD}$ according the following equation:

$$E_{k(n)} = (X_{k(n)} - X_{k,HD(n)}) \times H_{k(n)},$$

wherein the parameter n in the parentheses represents the time index of the OFDM symbols. The error estimate $E_{k(n)}$ is delivered to the update circuit 410 for improving the precision of the channel impulse response estimate $H_{k(n+1)}$ of the next time index of the OFDM symbols. In circuit 400 the hard decision block 412, error circuit 414, and update circuit 410 are added to refine the estimate of channel impulse response, and the hard decision estimate is fed back to the update circuit 410 to generate a more precise channel impulse response estimate through iteration. Thus, performance of circuit 400 is better than that of circuit 300 shown in FIG. 3.

Figure 5:
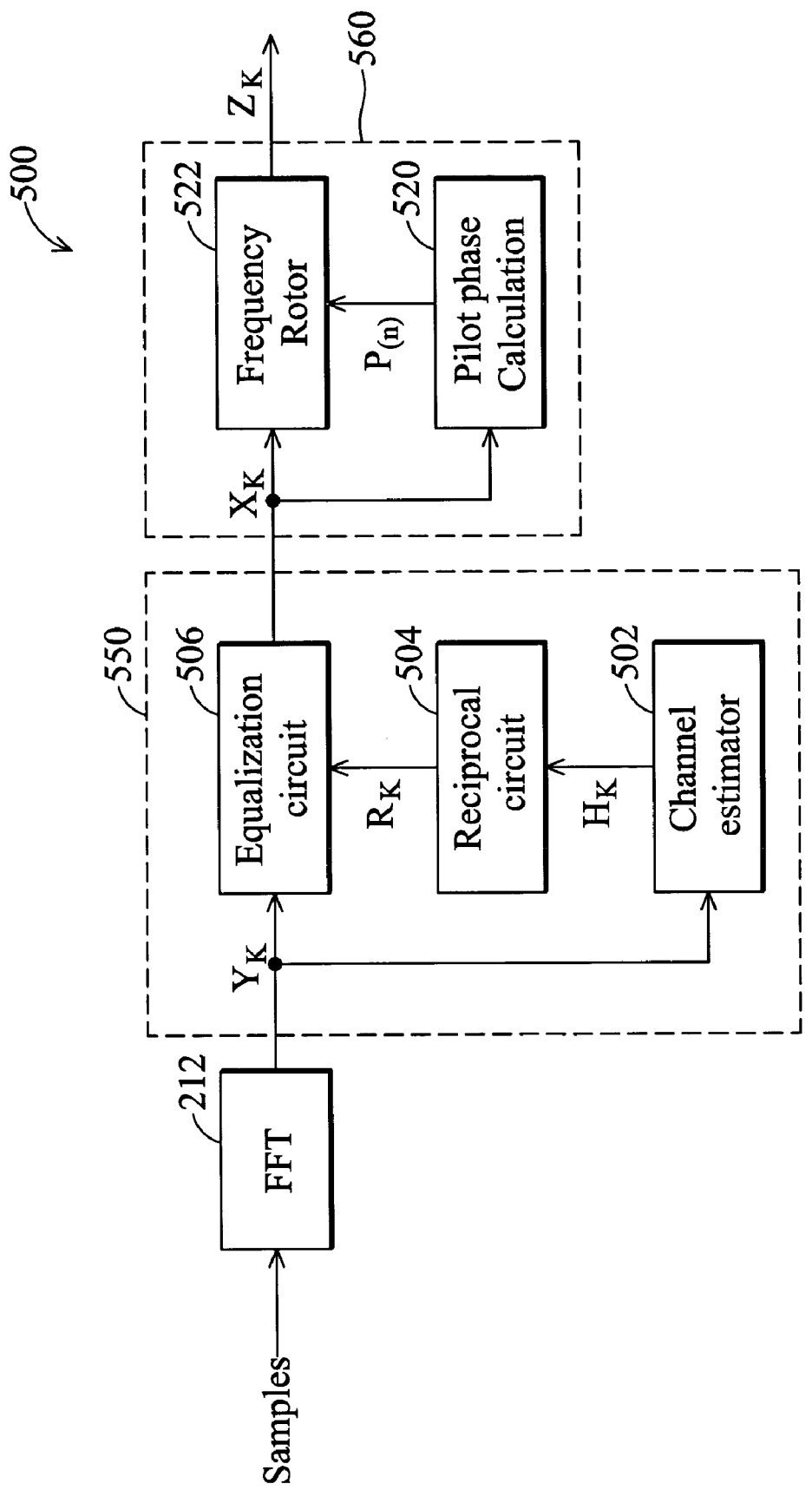
FIG. 5 illustrates the main function blocks of a circuit for channel equalization with remnant frequency offset compensation according to an embodiment of the present disclosure.

FIG. 5 illustrates the main function blocks of a circuit 500 for channel equalization with the remnant frequency offset compensation according to another embodiment of the present disclosure. The circuit 500 includes an equalizer 550 and a remnant frequency compensation module 560. Equalizer 550 resembles the equalizer 300 shown in FIG. 3, but a remnant frequency compensation module 560 is provided for remnant frequency offset compensation in frequency domain. The remnant frequency compensation module 560 uses a frequency rotor circuit for remnant frequency offset compensation by means of utilizing the phase of the pilot signals.

Because the equalizer 550 processes frequency domain data, samples of received signals are delivered to an FFT block 212 to perform fast Fourier transformation and convert the samples on the k-th sub-carrier to frequency domain signal $Y_k$, wherein the suffix k represents the order of sub-carriers. The equalizer 550 includes a channel estimator 502, a reciprocal circuit 504, and an equalization circuit 506. First, channel estimator 502 generates an estimate $H_k$ of the channel impulse response of the k-th sub-carrier. The reciprocal circuit 504 can then generate the reciprocal $R_k$ of the revised channel impulse response estimate $H_k'$. Equalization circuit 506 then compensates the signal $Y_k$ for channel distortion with the reciprocal $R_k$ to generate a signal $X_k$.

Signal $X_k$ is then fed to the remnant frequency compensation module 560, which includes a pilot phase calculation circuit 520 and a frequency rotor circuit 522. The pilot phase calculation circuit 520 can calculate phase offset coefficient $P_{(n)}$ with the prior symbol of the pilot signal $X_{pilot,j}$, which is actually the signal $X_k$ on the pilot sub-carriers with specific suffix k, and suffix j ranges from 1 to 4 because there are four pilot sub-carriers in the OFDM system. The phase offset coefficient $P_{(n)}$ is calculated according to the following equation:

$$P_{(n)} = \text{angle}\left(\sum_{j=1}^{4} [|H_{pilot,j(n)}|^2 \times (X_{pilot,j(n)} - X_{pilot,j(n-1)})]\right),$$

wherein $X_{pilot,j(n)}$ is the sample of j-th pilot signal of the signal X at the current time index n, $X_{pilot,j(n-1)}$ is the sample of the j-th pilot signal of the signal X at the last time index n−1, and $H_{pilot,j(n)}$ is the estimate of the channel impulse response of the j-th pilot sub-carrier at current time index n.

The frequency rotor circuit 522 rotates the phase of the signal $X_k$ with the phase angle of the phase offset coefficient $P_{(n)}$ calculated from samples of pilot signals to generate a signal $Z_k$. The frequency rotor circuit 522 generates signal $Z_k$ according to the following equation:

$$Z_{k(n)} = X_{k(n)} \times \exp(j \times P_{(n)}),$$

wherein the parameter n in the parentheses represents the time index of the OFDM symbols, exp( ) is the exponential function, and the signal $Z_k$ is the signal compensated for remnant frequency offset.

Figure 6:
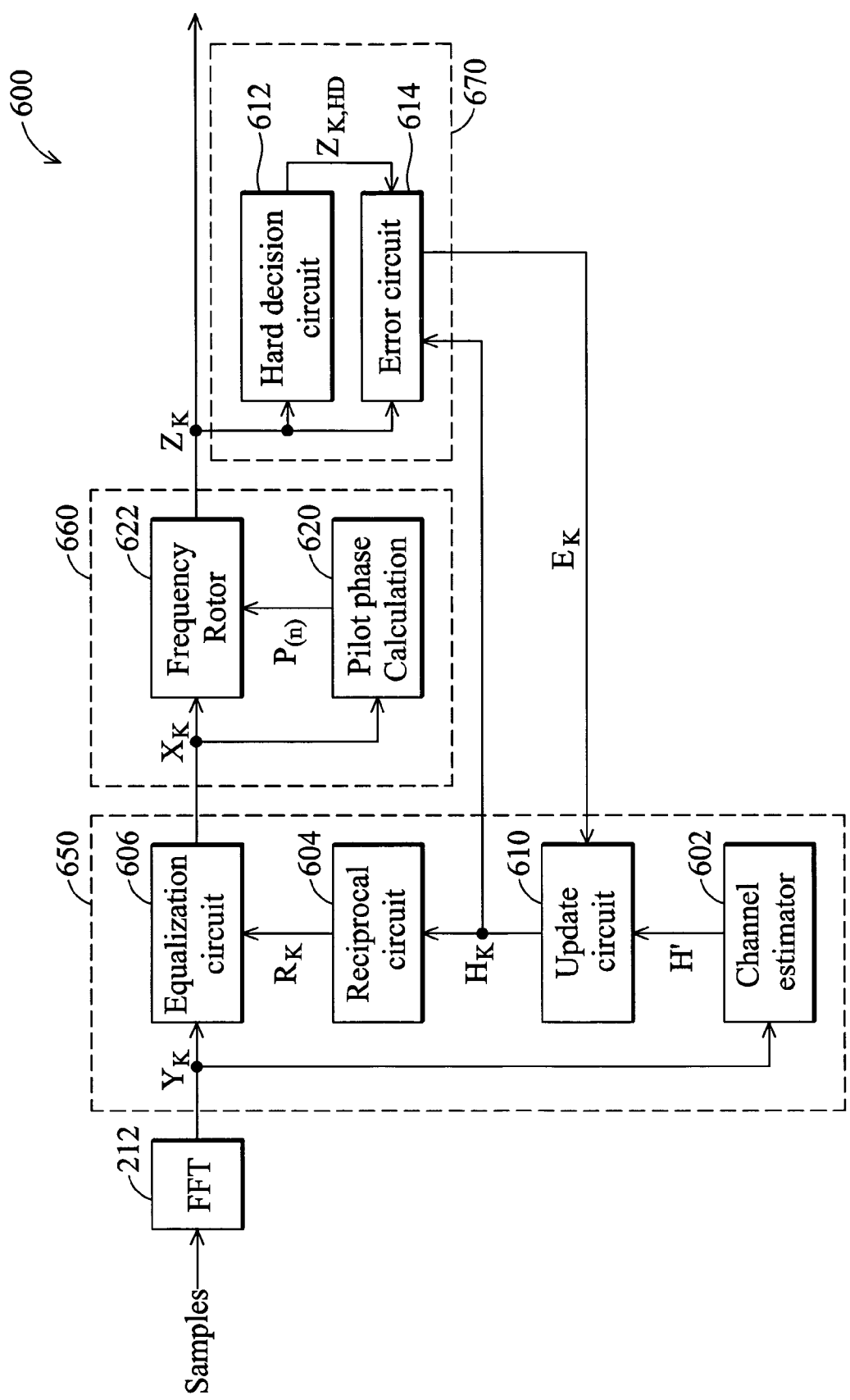
FIG. 6 illustrates the main function blocks of a circuit for channel equalization with improved channel frequency response accuracy and remnant frequency offset compensation according to an embodiment of the present disclosure.

FIG. 6 illustrates the main function blocks of a circuit 600 for channel equalization with improved channel frequency response accuracy and remnant frequency offset compensation according to another embodiment of the present disclosure. The circuit 600 includes an equalizer 650, a remnant frequency compensation module 660 and an error estimation module 670. Equalizer 650 resembles the equalizer 300 shown in FIG. 3, but the circuit 400 is combined with the circuit 500 by introducing both a remnant frequency compensation module 660 and an error estimation module 670 for improving the accuracy of channel impulse response and compensating for remnant frequency offset, respectively.

Because the equalizer 650 processes frequency domain data, samples of received signal are delivered to a FFT block 212 to perform fast Fourier transformation and convert the samples on the k-th sub-carrier to frequency domain signal $Y_k$, wherein the suffix k represents the order of sub-carrier. The equalizer 650 includes a channel estimator 602, an update circuit 610, a reciprocal circuit 604, and an equalization circuit 606. First, channel estimator 602 generates an estimate H' of the channel impulse response. An update circuit 610 then generates a revised estimate $H_{k(n)}$ of channel impulse response of the k-th sub-carrier at current time index n according to an error estimate $E_{k(n-1)}$ and a channel impulse response estimate $H_{k(n-1)}$ of the k-th sub-carrier at the last time index n−1 with the following equation:

$$H_{k(n)} = H_{k(n-1)} + u \times E_{k(n-)} \times \text{conj}(Z_{k,HD(n-1)}),$$

wherein the parameter n in the parentheses represents the time index of the OFDM symbols. The estimate H' of the channel impulse response from the channel estimator 602 is used as the initial value $H_{k(0)}$ of the channel impulse response of the k-th sub-carrier to generate the $H_{k(1)}$ and the estimates at the following time index by iteration. u is a predetermined constant, $E_{k(n-1)}$ is an error estimate at the last time index generated from an error circuit 614, and conj $(Z_{k(n-1)})$ is the conjugate of a signal $Z_{k(n-1)}$ at the last time index generated from the equalization circuit 606. The error estimate $E_{k(n-1)}$ and signal $Z_{k(n-1)}$ is further described in the following. The reciprocal circuit 604 can then generate the reciprocal $R_k$ Of the revised channel impulse response estimate $H_k$. Equalization circuit 606 then compensates the signal $Y_k$ for channel distortion with the reciprocal $R_k$ to generate a signal $X_k$.

Signal $X_k$ is then fed to the remnant frequency compensation module 660, which includes a pilot phase calculation circuit 620 and a frequency rotor circuit 622. The pilot phase calculation circuit 620 can calculate phase offset coefficient $P_{(n)}$ with the prior symbol of the pilot signal $X_{pilot,j}$, which is actually the signal $X_k$ on the pilot sub-carriers with specific suffix k, and suffix j ranges from 1 to 4 because there are four pilot sub-carriers in the OFDM system. The phase offset coefficient $P_{(n)}$ is calculated according to the following equation:

$$P_{(n)} = \text{angle}\left(\sum_{j=1}^{4} [|H_{pilot,j(n)}|^2 \times (X_{pilot,j(n)} - X_{pilot,j(n-1)})]\right),$$

wherein $X_{pilot,j(n)}$ is the sample of j-th pilot signal of the signal X at the current time index n, $X_{pilot,j(n-1)}$ is the sample of the j-th pilot signal of the signal X at the last time index n−1, and $H_{pilot,j(n)}$ is the estimate of the channel impulse response of the j-th pilot sub-carrier at current time index n.

The frequency rotor circuit 622 rotates the phase of the signal $X_k$ with the phase angle of the phase offset coefficient $P_{(n)}$ calculated from samples of pilot signals to generate a signal $Z_k$. The frequency rotor circuit 622 generates signal $Z_k$ according to the following equation:

$$Z_{k(n)} = X_{k(n)} \times \exp(j \times P_{(n)}),$$

wherein the parameter n in the parentheses represents the time index of the samples, exp( ) is the exponential function, and the signal $Z_k$ is the signal compensated for remnant frequency offset.

Signal $Z_k$ is then fed to the error estimation module 670, which includes a hard decision module 612 and an error circuit 614. The hard decision circuit 612 adopts a hard decision equation to generate a hard decision estimate $Z_{k,HD}$ of the signal $Z_k$. Thus, the error circuit 614 can calculate an error estimate $E_k$ between signal $Z_k$ and its hard decision estimate $Z_{k,HD}$ according the following equation:

$$E_{k(n)} = (Z_{k(n)} - Z_{k,HD(n)}) \times H_{k(n)},$$

wherein the parameter n in the parentheses represents the time index of the samples. The error estimate $E_k$ is delivered to the update circuit 610 for improving the precision of the channel impulse response estimate $H_{k(n+1)}$ at the next time index. In equalizer 600 the pilot phase calculation circuit 620 and frequency rotor circuit 622 are added to compensate for remnant frequency offset by means of utilizing the phase of the pilot signals. The hard decision block 612, error circuit 614, and update circuit 610 are also added to refine the estimate of channel impulse response, and the hard decision estimate is fed back to the update circuit 610 to generate a more precise channel impulse response estimate through iterations. Thus, the performance of circuit 600 is better than that of circuit 300 shown in FIG. 3.

Figure 7:
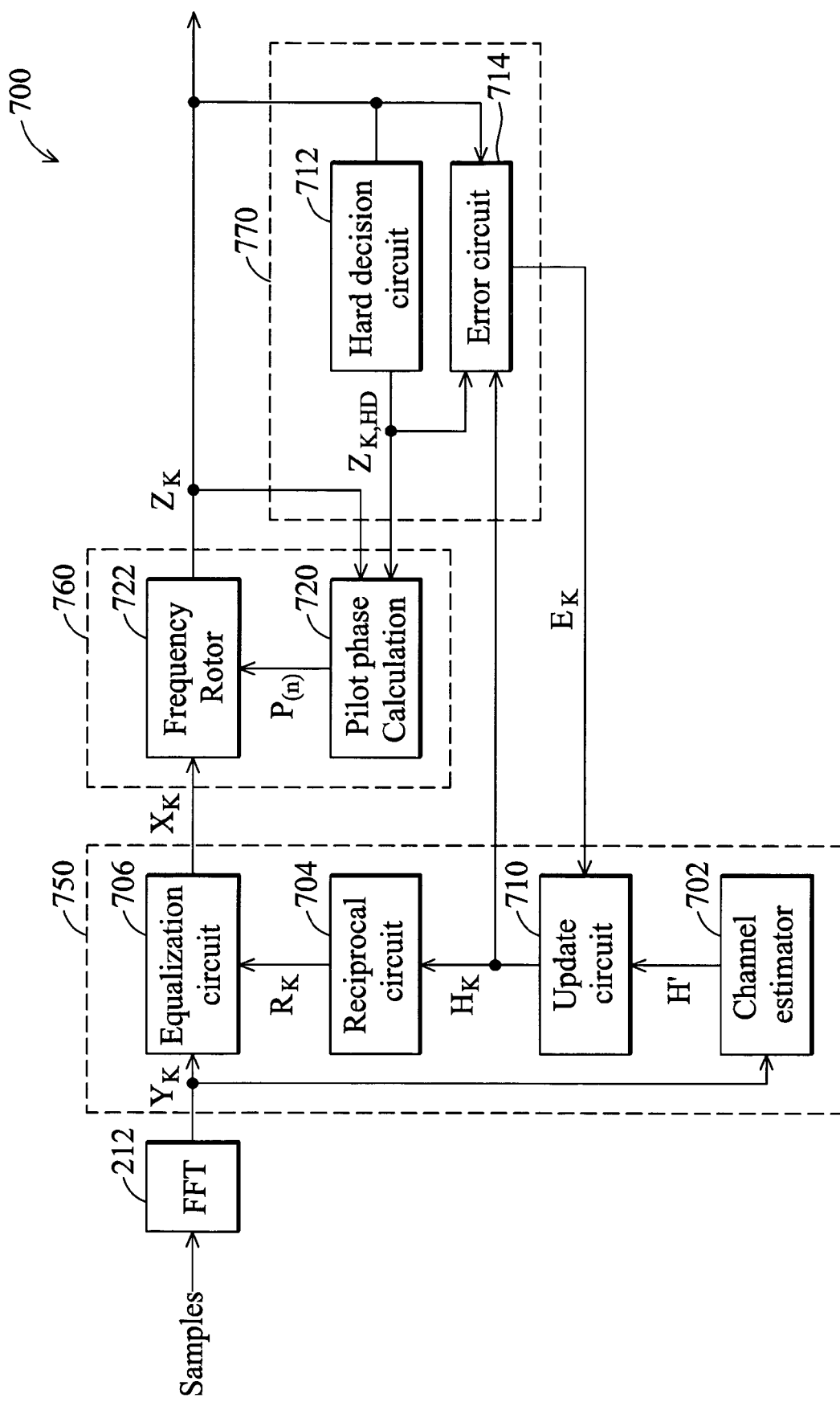
FIG. 7 illustrates the main function blocks of a circuit for channel equalization with improved channel frequency response accuracy and remnant frequency offset compensation according to another embodiment of the present disclosure.

Refer now to FIG. 7, which illustrates the main function blocks of a circuit 700 for channel equalization with improved channel frequency response accuracy and remnant frequency offset compensation according to another embodiment of the present disclosure. The circuit 700 includes an equalizer 750, a remnant frequency compensation module 760 and an error estimation module 770. Circuit 700 resembles the circuit 600 shown in FIG. 6, because it combines the circuit 400 with the circuit 500 by introducing both a remnant frequency compensation module 760 and an error estimation module 770 for improving the accuracy of channel impulse response and compensating for remnant frequency offset, respectively. It differs from the circuit 600 slightly in that the function performed by the pilot phase calculation circuit 720.

Because the equalizer 750 processes frequency domain data, samples of received signal are delivered to a FFT block 212 to perform fast Fourier transformation and convert the samples on the k-th sub-carrier to frequency domain signal $Y_k$, wherein the suffix k represents the order of sub-carrier. The equalizer 750 includes a channel estimator 702, an update circuit 710, a reciprocal circuit 704, and an equalization circuit 706. First, channel estimator 702 generates an estimate H' of the channel impulse response. An update circuit 710 then generates a revised estimate $H_{k(n)}$ of channel impulse response of the k-th sub-carrier at current time index n according to an error estimate $E_{k(n-1)}$ and a channel impulse response estimate $H_{k(n-1)}$ of the k-th sub-carrier at the last time index n−1 with the following equation:

$$H_{k(n)} = H_{k(n-1)} + u \times E_{k(n-1)} \times \text{conj}(Z_{k,HD(n-1)}),$$

wherein the parameter n in the parentheses represents the time index of the OFDM symbols. The estimate H' of the channel impulse response from the channel estimator 702 is used as the initial value $H_{k(0)}$ of the channel impulse response of the k-th sub-carrier to generate the $H_{k(1)}$ and the estimates at the following time index by iteration. u is a predetermined constant, $E_{k(n-1)}$ is an error estimate at the last time index generated from an error circuit 714, and conj $(Z_{k(n-1)})$ is the conjugate of a signal $Z_{k(n-1)}$ at the last time index generated from the equalization circuit 706. The error estimate $E_{k(n-1)}$ and signal $Z_{k(n-1)}$ is further described in the following. Then, the reciprocal circuit 704 can generate the reciprocal $R_k$ of the revised channel impulse response estimate $H_k$. Equalization circuit 706 then compensates the signal $Y_k$ for channel distortion with the reciprocal $R_k$ to generate a signal $X_k$.

Signal $X_k$ is then fed to the remnant frequency compensation module 760, which includes a pilot phase calculation circuit 720 and a frequency rotor circuit 722. The pilot phase calculation circuit 720 can calculate a phase offset coefficient $P_{(n-1)}$ with the pilot signal $Z_{pilot,j}$ and a hard decision estimate of the pilot signal $Z_{pilotHD,j}$. The pilot signal $Z_{pilot,j}$ is actually the signal $Z_k$ on the pilot sub-carriers with specific suffix k, and suffix j ranges from 1 to 4 because there are four pilot sub-carriers in the OFDM system. The phase offset coefficient $P_{(n)}$ is calculated according to the following equation:

$$P_{(n)} = \text{angle}\left(\sum_{j=1}^{4} Z_{pilot,j(n-1)} \times conj(Z_{pilotHD,j(n-1)}) \times |H_{pilot,j(n)}|^2\right),$$

wherein $Z_{pilot,j(n-1)}$ is the sample of the j-th pilot signal of the signal Z at time index n−1, $Z_{pilotHD,j(n-1)}$ is a hard decision estimate of the sample of the j-th pilot signal of the signal Z at time index n−1, conj( ) is the conjugate function, and $H_{pilot,j(n)}$ is the channel impulse response estimate of the j-th pilot sub-carrier.

The frequency rotor circuit 722 rotates the phase of the signal $X_k$ with the phase angle of the phase offset coefficient $P_{(n)}$ calculated from samples of pilot signals at last time index to generate a signal $Z_k$. The frequency rotor circuit 722 generates signal $Z_k$ according to the following equation:

$$Z_{k(n)}=X_{k(n)}\times\exp(j\times P_{(n)}),$$

wherein the parameter n in the parentheses represents the time index of the samples, exp( ) is the exponential function, and the signal $Z_k$ is the signal compensated for remnant frequency offset.

Then, signal $Z_k$ is fed to the error estimation module 770, which includes a hard decision module 712 and an error circuit 714. The hard decision circuit 712 adopts a hard decision equation to generate a hard decision estimate $Z_{k,HD}$ of the signal $Z_k$. Thus, the error circuit 714 can calculate an error estimate $E_k$ between signal $Z_k$ and its hard decision estimate $Z_{k,HD}$ according the following equation:

$$E_{k(n)}=(Z_{k(n)}-Z_{k,HD(n)})\times H_{k(n)},$$

wherein the parameter n in the parentheses represents the time index of the samples. The error estimate $E_k$ is delivered to the update circuit 710 for improving the precision of the channel impulse response estimate $H_{k(n+1)}$ at the next time index. In equalizer 700 the pilot phase calculation circuit 720 and frequency rotor circuit 722 are added to compensate for remnant frequency offset by means of utilizing the phase of the pilot signals. The hard decision block 712, error circuit 714, and update circuit 710 are also added to refine the estimate of channel impulse response, and the hard decision estimate is fed back to the update circuit 710 to generate a more precise channel impulse response estimate through iterations. Thus, performance of circuit 700 is better than that of circuit 300 shown in FIG. 3.

In this disclosure, we provide a simple method for estimating channel impulse response accurately and canceling the remnant effects of frequency offset in the wireless LAN environment. Because the equalization is more precise, the overall performance of the OFDM baseband receiver can be improved.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A circuit for improving accuracy of channel impulse response estimation and compensating for remnant frequency offset in a receiver of an orthogonal frequency division multiplexing (OFDM) system, the circuit comprising:

an equalizer, for compensating a first signal for channel distortion with a channel impulse response estimate adjusted according to a product of an error estimate and a conjugate of a third signal to generate a second signal;

a remnant frequency compensation module, coupled to the equalizer, for rotating a phase of the second signal with a phase angle of an phase offset coefficient calculated according to a plurality of pilot signals of the second signal to generate the third signal; and an error estimation module, coupled to the remnant frequency compensation module, for generating the error estimate according to the third signal and a hard decision estimate of the third signal, and the error estimate is further fed back to the equalizer to refine the channel impulse response estimate.

2. The circuit according to claim 1, wherein the remnant frequency compensation module includes:

a pilot phase calculation circuit, coupled to the equalizer, for calculating the phase offset coefficient according to the plurality of pilot signals of the second signal; and a frequency rotor circuit, coupled to the equalizer and the pilot phase calculation circuit, for rotating the phase of the second signal by the angle of the phase offset coefficient to generate the third signal.

3. The circuit according to claim 2, wherein the pilot phase calculation circuit calculates the phase offset coefficient according to a following equation:

$$P_{(n)}=\text{angle}\left(\sum_{j=1}^{m}[|H_{pilot,j(n)}|^2\times(X_{pilot,j(n)}-X_{pilot,j(n-1)})]\right)$$

wherein the suffix j represents an order of a plurality of pilot subcarriers, and the parameter n represents an OFDM symbol time index, $P_{(n)}$ is the phase offset coefficient at a current time index n, $X_{pilot,j(n)}$ is a j-th pilot signal of the second signal X at the current time index n, $X_{pilot,j(n-1)}$ is the j-th pilot signal of the second signal X at a last time index n−1, m is a total number of the pilot subcarriers, and $H_{pilot,j(n)}$ is the channel impulse response estimate of the j-th pilot sub-carrier at the current time index n.

4. The circuit according to claim 2, wherein the pilot phase calculation circuit is further coupled to the frequency rotor circuit and an error estimation module which generates the hard decision estimate of the third signal, and the pilot phase calculation circuit generates the phase offset coefficient according to a following equation:

$$P_{(n-1)}=\sum_{j=1}^{m}Z_{pilot,j(n-1)}\times conj(Z_{pilotHD,j(n-1)})\times|H_{pilot,j(n)}|^2$$

wherein the suffix j represents an order of a plurality of pilot subcarriers, and the parameter n represents an OFDM symbol time index, $P_{(n)}$ is the phase offset coefficient at a current time index n, $Z_{pilot,j(n-1)}$ is a j-th pilot signal of the third signal at a last time index n−1, $Z_{pilotHD,j(n-1)}$ is a hard decision estimate of the j-th pilot signal of the third signal at the last time index n−1, conj( ) is a conjugate function, m is a total number of the pilot subcarriers, and $H_{pilot,j(n)}$ is a channel impulse response estimate of a j-th pilot subcarrier.

5. The circuit according to claim 2, wherein the frequency rotor circuit generates the third signal according to the following equation:

$$Z_{k(n)}=X_{k(n)}\times\exp(j\times P_{(n)});$$

wherein the parameter n represents an OFDM symbol time index, $Z_{k(n)}$ is the third signal at a time index n, $X_{k(n)}$ is the second signal at the time index n, exp( ) is an exponential function, and $P_{(n)}$ is the phase offset coefficient at a time index n.

6. The circuit according to claim 1, wherein the error estimation module includes:

a hard decision circuit, coupled to the equalizer, for estimating the hard decision estimate of the third signal; and an error circuit, coupled to the hard decision circuit and the equalizer, for calculating the error estimate according to the hard decision estimate and the third signal.

7. The circuit according to claim 6, wherein the error circuit calculates the error estimate according to a following equation:

$$E_{k(n)}=(Z_{k(n)}-Z_{HD,k(n)}) \times H_{k(n)},$$

wherein the suffix k represents an order of a plurality of subcarriers, and the parameter n represents an OFDM symbol time index, $E_{k(n)}$ is the error estimate, $Z_{k(n)}$ is the third signal, $Z_{HD,k(n)}$ is the hard decision estimate, and $H_{k(n)}$ is the channel impulse response estimate.

8. The circuit according to claim 1, wherein the equalizer includes:
a channel estimator, for estimating an initial channel impulse response estimate;
an update circuit, coupled to the channel estimator and the error estimation module, for adjusting the initial channel impulse response estimate with the error estimate to generate the channel impulse response estimate; and
an equalization circuit, coupled to the update circuit, for compensating the first signal for channel distortion with the channel impulse response estimate to generate the second signal.

9. The circuit according to claim 8, wherein the update circuit generates the channel impulse response estimate according to a following equation:

$$H_{k(n)}=H_{k(n-1)}+u \times E_{k(n-1)} \times \text{conj}(Z_{k,HD(n-1)})$$

wherein the suffix k represents an order of a plurality of subcarriers, $H_{k(n)}$ is the channel impulse response estimate of a k-th subcarrier at a current time index n, $H_{k(n-1)}$ is the channel impulse response estimate of a k-th sub-carrier at a last time index n−1, u is a constant, $E_{k(n-1)}$ is an error estimate of the k-th subcarrier at the last time index n−1, $\text{conj}(Z_{k,HD(n-1)})$ is a conjugate of a hard decision estimate $Z_{k,HD}$ of the third signal $Z_k$ on the k-th subcarrier at the last time index n−1, and the initial channel impulse response estimate generated from the channel estimator is used as an initial value $H_{k(0)}$ of the channel impulse response of the k-th sub-carrier to generate the channel impulse response estimate $H_{k(1)}$ at a first time index.

10. The circuit according to claim 8, wherein the equalization circuit compensates the first signal for channel distortion according to the following equation:

$$X_{k(n)}=Y_{k(n)}/H_{k(n)};$$

wherein the suffix j represents an order of a plurality of pilot subcarriers, and the parameter n represents an OFDM symbol time index, $X_{k(n)}$ is the second signal, $Y_{k(n)}$ is the first signal, and $H_{k(n)}$ is the channel impulse response estimate.

11. A circuit for improving accuracy of channel impulse response estimation in a receiver of an orthogonal frequency division multiplexing (OFDM) system, the circuit comprising:
an equalizer, for compensating a first signal for channel distortion with a channel impulse response estimate adjusted according to a product of an error estimate and a conjugate of a feed back of a second signal to generate the second signal; and
an error estimation module, coupled to the equalizer, for generating the error estimate according to the second signal and a hard decision estimate of the second signal, and the error estimate is further fed back to the equalizer to refine the channel impulse response estimate.

12. The circuit according to claim 11, wherein the error estimation module includes:

a hard decision circuit, coupled to the equalizer, for estimating the hard decision estimate of the second signal; and
an error circuit, coupled to the hard decision circuit and the equalizer, for calculating the error estimate according to the hard decision estimate and the second signal.

13. The circuit according to claim 12, wherein the error circuit calculates the error estimate according to a following equation:

$$E_{k(n)}=(X_{k(n)}-X_{HD,k(n)}) \times H_{k(n)},$$

wherein the suffix k represents an order of a plurality of subcarriers, and the parameter n represents an OFDM symbol time index, $E_{k(n)}$ is the error estimate, $X_{k(n)}$ is the second signal, $X_{HD,k(n)}$ is the hard decision estimate, and $H_{k(n)}$ is the channel impulse response estimate.

14. The circuit according to claim 11, wherein the equalizer includes:
a channel estimator, for estimating an initial channel impulse response estimate;
an update circuit, coupled to the channel estimator and the error estimation module, for adjusting the initial channel impulse response estimate with the error estimate to generate the channel impulse response estimate; and
an equalization circuit, coupled to the update circuit, for compensating the first signal for channel distortion with the channel impulse response estimate to generate the second signal.

15. The circuit according to claim 14, wherein the update circuit generates the channel impulse response estimate according to a following equation:

$$H_{k(n)}=H_{k(n-1)}+u \times E_{k(n-1)} \times \text{conj}(X_{k,HD(n-1)})$$

wherein the suffix k represents an order of a plurality of subcarriers, $H_{k(n)}$ is the channel impulse response estimate of a k-th subcarrier at a current time index n, $H_{k(n-1)}$ is the channel impulse response estimate of a k-th sub-carrier at a last time index n−1, u is a constant, $E_{k(n-1)}$ is an error estimate of the k-th subcarrier at the last time index n−1, $\text{conj}(X_{k,HD(n-1)})$ is a conjugate of a hard decision estimate $X_{k,HD}$ of the second signal $X_k$ on the k-th subcarrier at the last time index n−1, and the initial channel impulse response estimate generated from the channel estimator is used as an initial value $H_{k(0)}$ of the channel impulse response of the k-th sub-carrier to generate the channel impulse response estimate $H_{k(1)}$ at a first time index.

16. The circuit according to claim 14, wherein the equalization circuit compensates the first signal for channel distortion according to the following equation:

$$X_{k(n)}=Y_{k(n)}/H_{k(n)};$$

wherein the suffix j represents an order of a plurality of pilot subcarriers, and the parameter n represents an OFDM symbol time index, $X_{k(n)}$ is the second signal, $Y_{k(n)}$ is the first signal, and $H_{k(n)}$ is the channel impulse response estimate.

17. A circuit for compensating for remnant frequency offset in a receiver of an orthogonal frequency division multiplexing (OFDM) system, the circuit comprising:
an equalizer, for compensating a first signal for channel distortion with a channel impulse response estimate adjusted according to a product of an error estimate and a conjugate of a feed back of a second signal to generate a second signal; and
a remnant frequency compensation module, coupled to the equalizer, for rotating a phase of the second signal with a phase angle of a phase offset coefficient calculated according to a weighted sum of differences between a plurality of pilot signals of the second signal to generate a third signal.

18. The circuit according to claim 17, wherein the remnant frequency compensation module includes:
a pilot phase calculation circuit, coupled to the equalizer, for calculating the phase offset coefficient according to the plurality of pilot signals of the second signal; and
a frequency rotor circuit, coupled to the equalizer and the pilot phase calculation circuit, for rotating the phase of the second signal by the angle of the phase offset coefficient to generate the third signal.

19. The circuit according to claim 18, wherein the pilot phase calculation circuit calculates the phase offset coefficient according to a following equation:

$$P_{(n)} = \text{angle}\left(\sum_{j=1}^{m}[|H_{pilot,j(n)}|^2 \times (X_{pilot,j(n)} - X_{pilot,j(n-1)})]\right)$$

wherein the suffix j represents an order of a plurality of pilot subcarriers, and the parameter n represents an OFDM symbol time index, $P_{(n)}$ is the phase offset coefficient at a current time index n, $X_{pilot,j(n)}$ is a j-th pilot signal of the second signal X at the current time index n, $X_{pilot,j(n-1)}$ is the j-th pilot signal of the second signal X at a last time index n−1, m is a total number of the pilot subcarriers, and $H_{pilot,j(n)}$ is the channel impulse response estimate of the j-th pilot sub-carrier at the current time index n.

20. The circuit according to claim 18, wherein the frequency rotor circuit generates the third signal according to the following equation:

$$Z_{k(n)} = X_{k(n)} \times \exp(j \times P_{(n)});$$

wherein the parameter n represents an OFDM symbol time index, $Z_{k(n)}$ is the third signal at a current time index n, $X_{k(n)}$ is the second signal at the current time index n, exp( ) is an exponential function, and $P_{(n)}$ is the phase offset coefficient at the current time index n.

21. The circuit according to claim 17, wherein the equalizer includes:
a channel estimator, for estimating an initial channel impulse response estimate; and
an equalization circuit, coupled to the channel estimator, for compensating the first signal for channel distortion with the initial channel impulse response estimate to generate the second signal.

22. The circuit according to claim 21, wherein the equalization circuit compensates the first signal for channel distortion according to the following equation:

$$X_{k(n)} = Y_{k(n)}/H_{k(n)};$$

wherein the suffix j represents an order of a plurality of pilot subcarriers, and the parameter n represents an OFDM symbol time index, $X_{k(n)}$ is the second signal, $Y_{k(n)}$ is the first signal, and $H_{k(n)}$ is the channel impulse response estimate.

* * * * *